United States Patent

[11] 3,570,573

| [72] | Inventors | Leon F. Marker |
| | | Cuyahoga Falls; |
| | | Daniel A. Meyer, Akron, Ohio |
| [21] | Appl. No. | 708,006 |
| [22] | Filed | Feb. 26, 1968 |
| [45] | Patented | Mar. 16, 1971 |
| [73] | Assignee | The General Tire & Rubber Company |

[54] FILAMENT REINFORCED STRUCTURAL PLY FOR A PNEUMATIC TIRE
10 Claims, 7 Drawing Figs.

[52] U.S. Cl. .................................................. 152/359, 152/361
[51] Int. Cl. .................................................. B60c 9/00
[50] Field of Search ........................................ 152/354, 355, 357, 361

[56] References Cited
UNITED STATES PATENTS

| 3,024,828 | 3/1962 | Smith et al. ............... | 152/354 |
| 3,095,027 | 6/1963 | Weber ....................... | 152/361 |
| 3,315,722 | 4/1967 | Marzocchi et al. .......... | 152/359 |

Primary Examiner—Joseph R. Leclair
Attorneys—Frank C. Rote, Jr. and Harry F. Pepper, Jr.

ABSTRACT: A high modulus structural ply for a pneumatic tire which is composed of mutually parallel, continuous cords embedded in an elastomeric compound which contains uniformly dispersed, short fibers oriented in a particular direction. Such a ply construction may be utilized as carcass plies and/or breakers in "bias-ply" tires or, as carcass plies and/or belts in "radial-ply" tires.

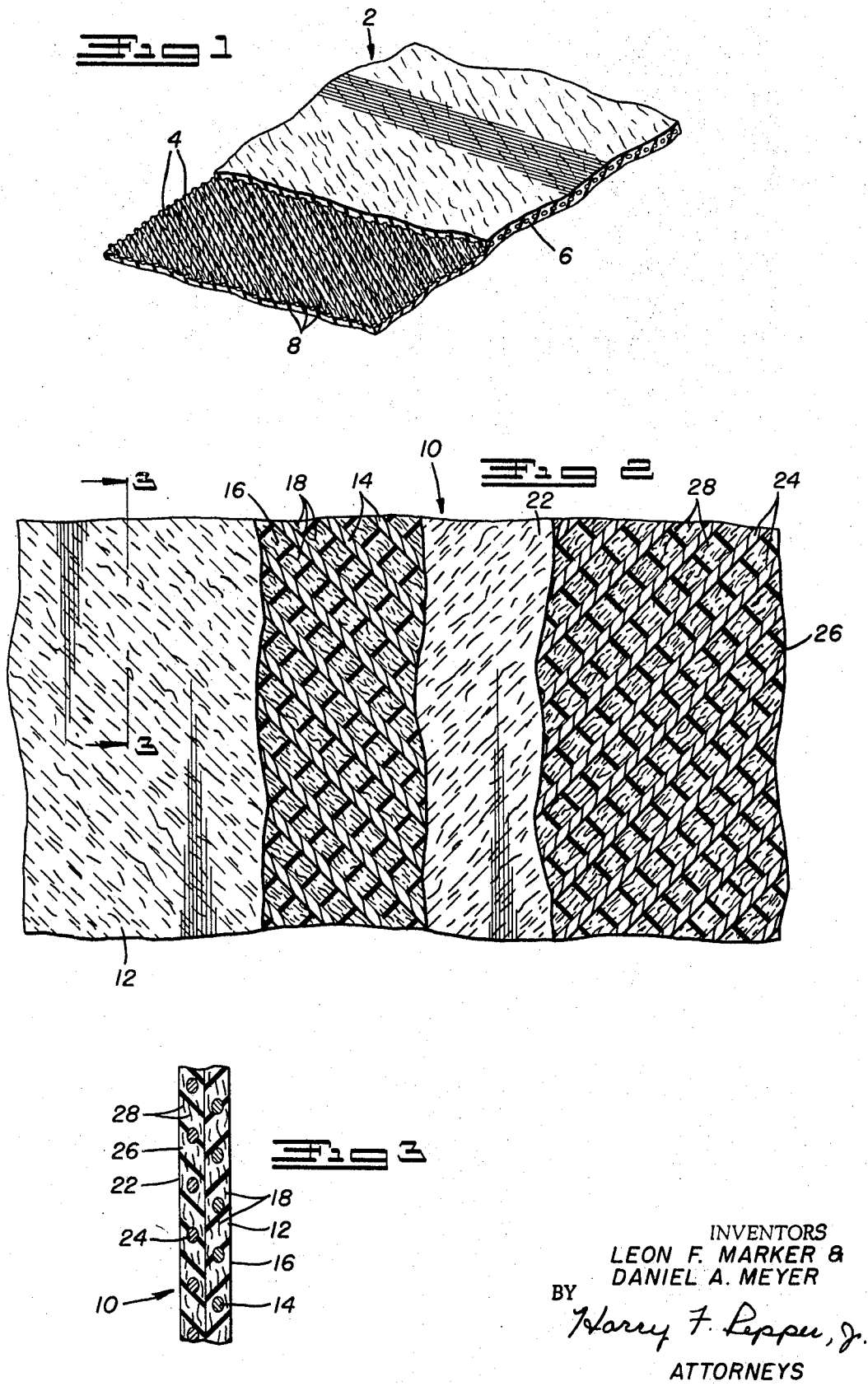

INVENTORS
LEON F. MARKER &
DANIEL A. MEYER

Patented March 16, 1971

INVENTORS
LEON F. MARKER &
DANIEL A. MEYER
BY Harry F. Pepper, Jr.
ATTORNEYS

FILAMENT REINFORCED STRUCTURAL PLY FOR A PNEUMATIC TIRE

BACKGROUND OF THE INVENTION

The invention relates to the particular design of a structural cord ply member for use in a pneumatic tire.

The strength and stability of pneumatic tires are most always dependent upon high modulus fiber-rubber composite bands or strips, normally called plies.

The most popular ply construction is that of a layer of mutually parallel continuous lengths of cords which are embedded in a particular rubber compound, sometimes called a "skim." The cords are usually of relatively high strength material such as nylon, rayon, polyester, glass, or wire. Depending upon the rubber compound, the fiber material, and the use intended for a ply construction, it is commonly known that additional substances may be applied to the cords or added to the compound for purposes of improving or promoting the adhesion between the cords and the rubber matrix. Ply bands or strips are cut from a length of prepared ply stock such that the cords lie on a bias. The bias angle of the cords in a particular cut strip will depend upon its intended function in the tire structure in which it is to be used.

The cord ply an be a component of a tire carcass. The carcass is the structural frame of a tire and usually consists of a plurality of cord plies. The cords of a carcass ply extend continuously from one inextensible bead portion, through an adjacent sidewall portion, crown portion, opposite sidewall portion and are anchored the opposite bead portion of the tire. These cords are sometimes made to pass through the crown of the tire at an acute angle to the plane of the circumferential centerline of the tire. In such case, the tire is termed a bias-ply tire. If the cords are made to pass through the crown at an angle of approximately 90° to this plane, the tire is called a radial-ply tire.

The carcass of a bias-ply tire contains an even number of carcass plies wherein the cords of each ply proceed continuously on a diagonal from one bead portion to another and cross the crown at equal, but opposite, angle relative to its adjacent ply or plies. The smaller the crown angle of the cords, the greater the lateral stability of the tire. Also, a tire with large angle carcass plies does not wear as well as a tire having smaller angle carcass plies. A carcass ply cord angle of around 30° at the crown has sometimes been considered the best compromise between satisfactory stability and wear in a bias-ply tire.

Tires exhibiting the best wear have been radial-ply tires, e.g. a carcass ply cord angle of 90° relative to the plane of the circumferential centerline of the tire. However, these tires are found to be relatively unstable, particularly in a lateral direction.

To augment the stability and wear of these two basic types of tires, endless, circumferentially extending plies, called tread plies, have been utilized between the tread and the carcass of the tire.

Tread plies used in a bias ply tire are usually called breakers. A breaker is characterized in that the mutually parallel cords are at a relatively large angle relative to the plane of the circumferential centerline of the tire. A breaker serves to protect the carcass from local impacts and to keep the tread portion of the tire in uniform contact with the road surface. The breaker also improves the lateral stability of the tire.

The tread ply or plies in characterized radial ply tire are usually called belts. A belt is characterized in that the angle at which its cords cross the plane of the circumferential centerline of the tire is relatively small. A primary function of a belt is to hold the tire stable in a lateral direction. This belt also functions to protect the carcass from local impact as does a breaker in a bias-ply tire.

A tread ply, whether in a bias-ply or radial-ply tire, improves the bond between the tread and the carcass.

Depending upon the type of tire, e.g. bias or radial, and upon its use, e.g. passenger, truck, or "off the road," the plies which go into the construction of a tire may vary widely in design. The plies can vary with the type of cord material, spacing between cords and cord angle. Also, the type of rubber used as the skim compound is dependent upon how the ply is to be used.

Recently, attempts have been made to depart from the basic physical design of plies of the type discussed above. There have been attempts to substitute discrete fibers or fiber bundles of conventional cord material for the continuous cord lengths. Such a construction has been suggested for use as a belt, breaker and/or carcass ply. Such a ply consists of discrete filaments of cord material and/or small multifilament bundles embedded in an elastomeric matrix. Plies of this type, although simply and economically made from a production standpoint, have been unpredictable in operation because the fiber orientation has not been controlled and rubber-fiber adhesion has been difficult. Plies constructed in this way have unpredictable directions of stiffness, which is a highly undesirable characteristic in almost all high modulus structural ply members.

In addition, there have been suggestions to use discrete fibers and fiber bundles o supplement the effect of continuous cord lengths of a conventional ply member. These suggestions have been disclosed in Madge et al. U.S. Pat. NO. 2,056,012 and in two Marzocchi Patents, U.S. Pat. Nos. 3,315,722 and 3,334,166 . These patents suggest the reinforcement of the elastomeric matrix surrounding continuous cords by discrete fibers and/or fiber bundles, where the fibers or fiber bundles may or may not be treated in order to enhance their adhesion to the matrix.

In the Madge et al. Patent and in the Marzocchi U.S. Pat. No. 3,315,722, the elastomeric matrix about the cords contains randomly dispersed fibers and fiber bundles. It is found that in such a situation, the fibers and fiber bundles tend to act as flaws or impurities in the matrix. This causes certain physical deteriorations in the ply matrix, and therefore, the ply is unreliable during performance.

In the Marzocchi patent U.S. Pat. No. 3,334,166 , it is suggested that pretreated discrete fibers and fiber bundles of glass be oriented throughout the matrix surrounding the continuous cords. According to this patent, multiple fiber bundles of glass are necessary to the proper function of such plies. It is found that, although the discrete filament component of such a construction may be oriented in a certain direction, the multifilament component cannot. Also, the fiber bundles, because of their size, act as flaws or impurities in the matrix compound. The presence of these bundles results in a hetereogeneous distribution of fibers throughout the matrix. This causes a nonuniform strength distribution in the ply. Further, in constructing a ply, such as suggested in U.S. Pat. No. 3,334,166, extreme care is necessary in the milling operation in order that the alleged necessary multifilament components remain intact. A further characteristic of such a construction is that fiber bundles may locate at or near the surface of the ply and affect the adhesion between adjacent plies. Also, fiber-rubber adhesion problems are more acute within the matrix of an individual ply when fiber bundles are present.

SUMMARY OF THE INVENTION

It is an object of the invention to provide a novel cord-ply construction for use in a pneumatic tire.

It is another object of the invention to provide a novel cord-ply construction which can be used as a carcass and/or tread-ply in a pneumatic tire construction.

It is still another object of the invention to provide a cord-ply construction of mutually parallel, continuous cords contained in a filament reinforced matrix.

It is yet another object of the invention to provide a cord-ply construction which exhibits a higher modulus than has heretofore been present in conventional cord-ply constructions, and satisfactory performance when in use.

The novel cord ply construction to which the present invention relates is characterized in that a conventional ply comprising mutually parallel continuous lengths of cords in an elastomeric matrix is reinforced by the inclusion of uniformly dispersed discrete filaments of conventional cord material throughout that matrix. The discrete filaments of cord material in addition to being uniformly dispersed throughout the matrix of elastomeric compound, are all oriented in the same predetermined direction relative to the direction of the continuous lengths of cords. This construction results in a ply of greater strength than a conventional ply in which the matrix contains no reinforcement. Plies containing such a reinforcement also avoid certain shortcomings of other types of reinforced elastomeric matrices which have been described in the prior art.

BRIEF DESCRIPTION OF THE DRAWINGS

FIG. 1 shows a partial perspective view with parts broken away, of a cord-ply member constructed according to the present invention.

FIG. 2 shows a plan view of two adjacent plies constructed according to the present invention, with parts broken away, in which the continuous lengths of cords are at equal but opposite angles.

FIG. 3 shows a partial cross-sectional view along lines 3-3 of the two adjacent plies in FIG. 2.

PREFERRED EMBODIMENTS OF THE INVENTION

Figure 4:
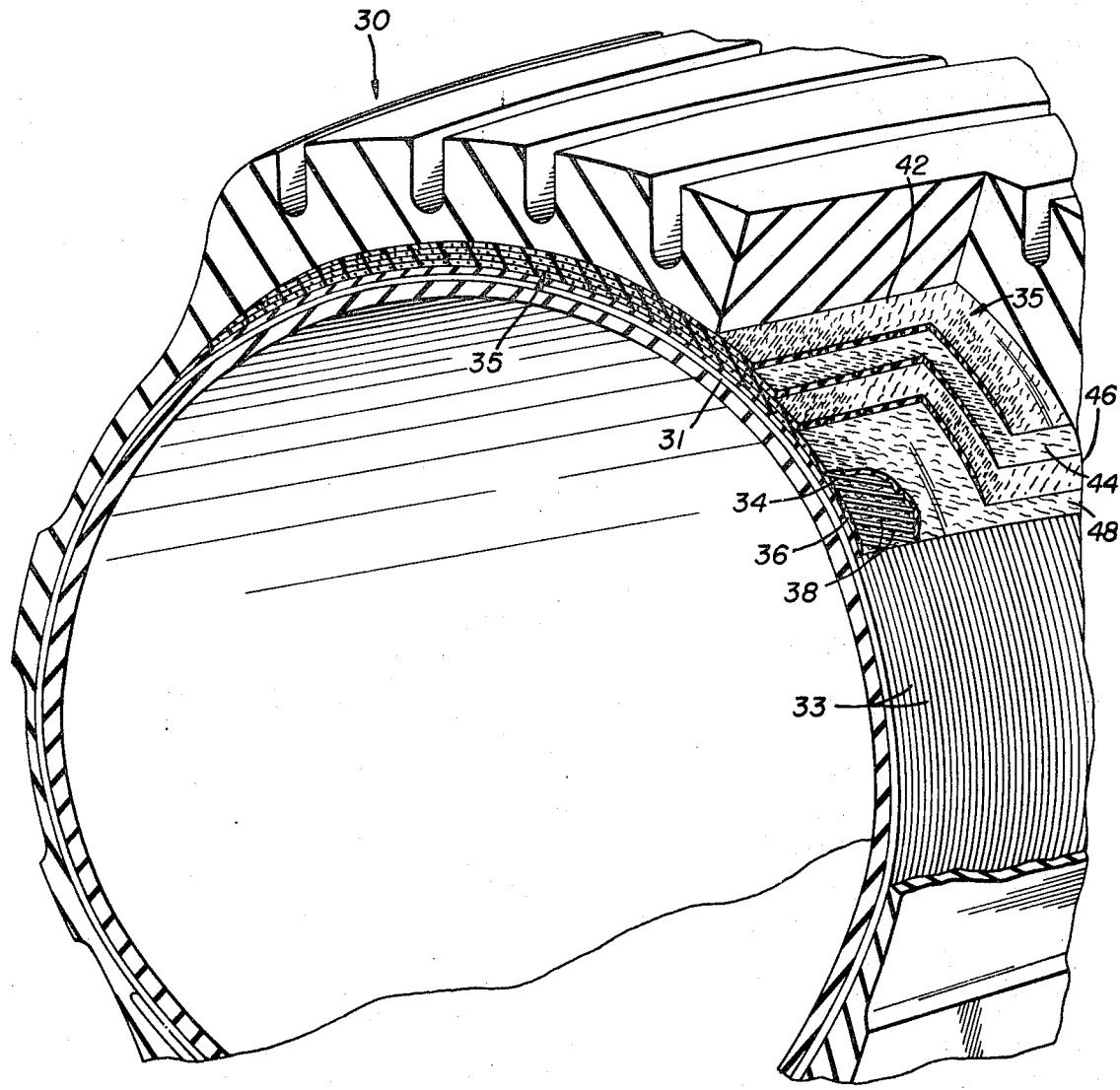
FIG. 4 shows a partial perspective view of a radial ply tire, with parts broken away and shown in section, in which a plurality of tread plies or belts are cord ply members constructed according to the present invention.

Before proceeding to a description of the several views which show the invention in its preferred embodiments, it may be helpful to explain some of the terminology used in that description and in the appended claims.

The term "cord-ply member" is intended to refer to a rubber-cord composite strip in a tire construction whether used as a carcass ply or a tread ply.

A "carcass breaker" is a cord ply member component of the body or carcass of a pneumatic tire.

A "tread ply" is an endless, circumferentially extending cord ply member located between the carcass and tread in a pneumatic tire construction.

The terms "breaker" and "belt" are to refer to a tread-ply in a bias-ply and radial-ply tire, respectively.

A "bias-ply" pneumatic tire is intended to refer to a tire in which the cords of the carcass plies cross the plane including the circumferential centerline of the tire at a diagonal or acute angle.

A "radial-ply" pneumatic tire is intended to refer to a pneumatic tire in which the cords in the carcass cross the plane including the circumferential centerline of the tire at angle of 90.

A "cord" is a length of tire cord material of the type commonly used in the prior art, which is usually made up of a plurality of strands of such material. Strand, in turn, are a gathered plurality of filaments. For example, some of the more popular cords are made up of wound strands of either rayon, nylon, polyester, cotton, glass or metallic filaments.

A "filament" is an individual fiber of tire cord material of the type commonly used in the prior art, as for example, rayon, nylon, polyester, cotton, glass or metal, which can be gathered into strands for winding into cords.

The rubber matrix or "skim" component of a pneumatic tire cord ply member may be reinforced with short fibers of cord material. The fibers can be "greige" or bare, or treated to greatly enhance certain desired physical properties of the ply as is common in the prior art discussed above. However, the reinforcement must be such that the resulting matrix will remain, in effect, a physically homogeneous structure and will not adversely affect any functional characteristics of the ply member as a whole.

It has bee found that if the skim compound of a ply member be reinforced with uniformly dispersed, definitely oriented, short, discrete filaments of conventional cord material, that the resultant strengthening effect on the skim compound will be fully realized in the ply itself, without adversely affecting its functional characteristics.

The magnitude of this strengthening effect can be demonstrated by comparing the physical properties of a calendered sheet of conventional skim compound with that of an identical skim compound reinforced as described above.

Two sheets of skim compound were prepared by identical steps, except that one contained a plurality of oriented, short, discrete, glass filaments, uniformly dispersed throughout the compound. Certain properties of the filament-filled compound are compared to the conventional compound in the following table:

| Property | Conventional compound | Filament filled compound |
| --- | --- | --- |
| 100% modulus, p.s.i. | 300 | 650 |
| 20% modulus, p.s.i. | 62 | 310 |
| 10% modulus, p.s.i. | 42 | 210 |
| 5% modulus, p.s.i. | 21 | 128 |
| Shore hardness | 56 | 71 |
| Elongation at rupture, percent | 450 | 420 |

An examination of this data shows that a very high modulus is obtained at the lower extensions (e.g. 5 percent, 10 percent or 20 percent), while the elongation at rupture is not drastically changed. The skim containing the glass filaments is also indicated as having better hardness characteristics. The general outcome is the same when conventional compounds are compared with compounds containing filaments of other types of conventional cord material.

Referring now to FIG. 1, a cord ply member 2, constructed according to the invention is shown including a layer of mutually parallel, continuous lengths of tire cords 4 embedded in an elastomeric compound 6. The elastomeric compound 6 contains uniformly dispersed, discrete filaments 8 of tire cord material which are shown oriented parallel to the cord lengths 4.

The cord ply member 2 is made by adding filaments such as 8, or chopped pieces of whole cord with an elastomeric compound to a conventional mill which uniformly disperses the filaments throughout the compound. The amount of milling necessary to obtain the proper dispersion of filaments depends on whether the reinforcement material is added in the form of discrete filaments or as filament bundles. The milling time also depends upon the specific filament material added and the type of elastomeric compound. In any case, the milling must be done for a period of time in order to insure that the reinforcement is present only as discrete filaments and is uniformly dispersed throughout the compound. If chopped or short lengths of cord material are added instead of filaments, several additional passes through the mill are required in order that the chopped cords will deagglomerate into the desired short discrete fibers.

After a certain number of milling passes, while the filamentary material is being homogeneously dispersed throughout the compound, it is important to note that the filamentary material will tend to decrease in length. However, this decrease in length will reach an equilibrium point, e.g. a certain limit in length, at which any further milling will not affect the filament size. This equilibrium point in filament size varies for different filamentary material. For example, the equilibrium size for glass is about 0.020 in. This phenomenon is important in that, if desired, a reinforced skim compound can be made where the filaments are all substantially identical in length. This is also important from a production standpoint, in that "scrap" filament-filled compound may be collected and remilled together with a fresh amount of compound and filament material. Such advantages as these result from the fact that the reinforced matrix desired is to be reinforced only with discrete filaments, rather than with a combination of filaments and filament bundles. Also, a reinforcement containing only filaments of a particular material exhibit much better rubber adhesion characteristics than does reinforcement containing random groups of fiber bundles.

To construct the ply as particularly shown in FIG. 1, the filament filled compound can then be directly calendered upon continuous lengths of cords and the calendering operation will serve to orient the fibers dispersed throughout the compound in a direction parallel to the lengths of the cord.

It may be desirable, however, to have the filament material oriented in another predetermined direction which direction would not be parallel to the cord lengths. To construct a cord ply member in this way, the filament filled compound is calendered separately after milling to orient the filaments in a given direction. The mutually parallel lengths of cords are then topped with this preoriented filament-filled sheet of compound in such a way that the filaments are oriented in a direction relative, but not parallel to the cord lengths. It can thus be seen that by different combinations of filament orientation and/or orientation, plies can be constructed which exhibit selected combinations of various directional strengths.

The cord-ply member shown in FIG. 1, with uniformly dispersed filaments oriented parallel to the cords would be a preferred embodiment of this invention, since to calender the filament-filled elastomeric compound directly on the cords after milling would be the easiest way of constructing such a ply from a production standpoint.

In FIGS. 2 and 3 is shown a double-ply construction composed of two cord ply members each containing continuous lengths of cords in a filament reinforced elastomeric matrix. The double ply construction generally designated 10 has a top ply 12 containing continuous lengths of cords 14 embedded in an elastomeric composition 16, which composition contains uniformly dispersed oriented fibers 18. The lower ply 22 contains continuous lengths of cords 24 running in an opposite direction relative to the cords 14 in the top ply 12. The cords 24 of the lower ply 22 are also embedded in a similar elastomeric composition 26 containing oriented filaments 28. The filaments 18 in the ply 12 are shown oriented parallel to the direction of cords 14, while the filaments 28 in the ply 22 are oriented parallel to the cords 24. It is to be noted, however, that the two groups of filaments 18 and 28 in each of the plies 12 and 22 an be oriented in any particular common direction. The two filament groups are shown oriented in a direction parallel to their respective cords only with a view toward ease of manufacture from a production standpoint, as described previously.

The views in FIGS. 4 through 7 show several embodiments in which the novel cord ply member of this invention may be used. In FIG. 4 is shown a radial ply pneumatic tire 30 including a conventional radial ply 31 of cords 33 which are to extend 90° across the crown of the tire. As mentioned previously, a radial ply tire although favorable from a wear standpoint, is unstable, laterally. Therefore, radial ply tires frequently contain a circumferentially extending tread-ply or plies to overcome this instability. These tread plies in a radial-ply tire are called belts. In FIG. 4 is shown a 4-belt construction generally designated as 35 in which each of the four belts are constructed similar to lower ply 48, which contains continuous lengths of cords, such as 34, embedded in an elastomeric compound, such as 36, which is reinforced with oriented filaments 38. The continuous lengths of cords at the top ply 42 pass through the circumferential plane of the tire at an equal but opposite angle than do the cords of its adjacent ply 44. Also, the continuous cords in the ply 46 extend across the circumferential plane of the tire at an equal but opposite angle relative to its adjacent ply 48, but at the same angle as the top ply 42. Preferably the filaments in each of these plies are in a predetermined direction parallel to their respective cords, but may alternatively be oriented in some other particular direction in each of the plies. As discussed previously, the angle at which the cords of a belt assembly such as 35 cross the circumferential central plane of the tire is relatively small, usually around 15° or less.

Figure 5:
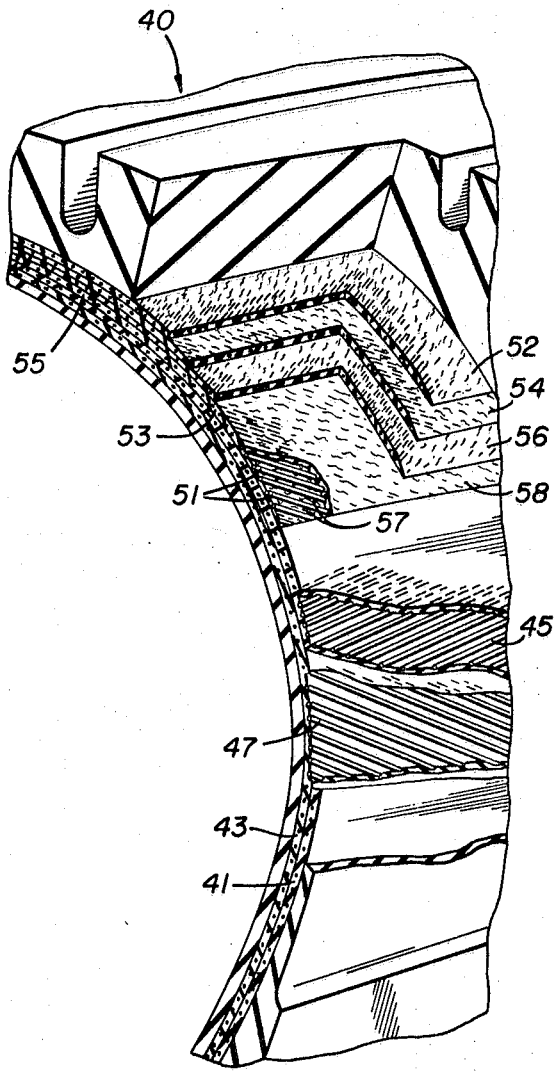
FIG. 5 shows a partial perspective view of a bias ply tire, with parts broken away and shown in section, in which the tread plies or breakers are cord ply members constructed according to the present invention.

FIG. 5 shows a conventional bias ply tire 40 containing two carcass plies 41 and 43 containing diagonally extending cords 45 and 47, respectively. These cords extend across the crown of the tire at an equal but opposite angle relative to the circumferential central plane of the tire. A tread-ply assembly 55 containing four high-angle breakers, 52, 54, 56, and 58 is shown in FIG. 5. Each of these high-angle breakers are constructed as breaker 56, e.g. with continuous lengths of cords, such as 51, embedded in an elastomeric compound 53 which is filled with filaments 57 oriented in a direction parallel to the cords 51. The plies 54 and 58 contain continuous lengths of cords extending across the crown of the tire at equal but opposite angles.

Figure 6:
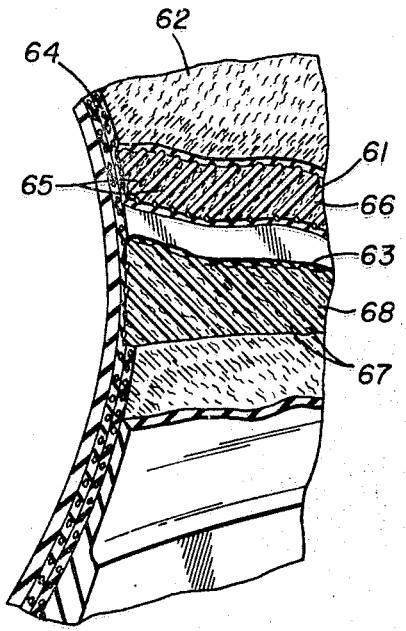
FIG. 6 is a partial perspective view of the sidewall of a bias-ply tire, with parts broken away and shown in section, in which the carcass is composed of cord-ply members constructed according to the present invention.
Figure 7:
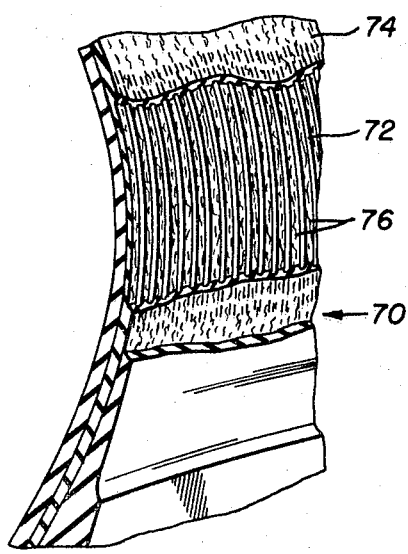
FIG. 7 shows a partial perspective view of a sidewall of a radial-ply tire, with parts broken away and shown in section, in which the carcass comprises a cord-ply member constructed according to the present invention.

Reinforced cord ply members constructed according to this invention may also be used as carcass plies as shown in FIGS. 6 and 7. FIG. 6 shows two carcass plies 62 and 64 as containing continuous lengths of cords 66 and 68, respectively. The cords 66 of ply 62 extend across the crown of the tire at an equal but opposite angle as that of cords 68 of ply 64. Each layer of cords 66 and 68 are embedded in elastomeric matrices 61 and 63, respectively. Each matrix 61 and 63 is reinforced by oriented filaments of cord material 65 and 67, respectively. The filaments 65 and 67 are shown oriented parallel to the cords in their respective plies, but it is again noted that these filaments may be oriented in some other predetermined direction.

In FIG. 7 is shown the carcass of a radial ply tire generally designated 70 which has mutually parallel cords 72 embedded in an elastomeric matrix 74 containing oriented filaments 76. The cords 76 are to pass through the crown of the tire at approximately a 90° angle.

Cord-ply members containing oriented, discrete filaments show definite advantages over conventional cord ply members in the several embodiments discussed above. This is due to certain features peculiar to the novel filament filled ply which are not present in a conventional cord-ply (e.g. containing no oriented, discrete filaments). When compared to a conventional cord-ply in any of the embodiments described, a filament-filled cord-ply can feature:

1. a higher resistance to impact and/or penetration,
2. a higher modulus for a given cord angle,
3. a broader range in cord angle selection to effect a desired degree of stability,
4. a savings of material by wider cord spacing for a particular strength requirement, and/or
5. practically an unlimited number of distinctive force distributions by controlled orientations of the filaments relative to the continuous cords.

There are certain obvious modifications which can be made relative to the foregoing detailed description which are intended to fall within the scope of the invention as fairly demonstrated by that description.

We claim:

1. In a pneumatic tire which includes a cord-ply member comprising spaced, mutually parallel, continuous lengths of cords in an elastomeric matrix containing fiber reinforcement, the improvement wherein said reinforcement consists of a plurality of short, discrete filaments, said filaments being a. uniformly dispersed throughout said elastomeric matrix, and b. oriented in a predetermined direction relative to said continuous lengths of cords.

2. The structure as defined in claim 1, wherein said pneumatic tire is a bias-ply tire.

3. The structure as defined in claim 2, wherein said cord-ply member is a carcass-ply.

4. The structure as defined in claim 2, wherein said cord-ply member is a breaker.

5. The structure as defined in claim 1, wherein said pneumatic tire is a radial-ply tire.

6. The structure as defined in claim 5, wherein said cord-ply member is a carcass-ply.

7. The structure as defined in claim 5, wherein said cord ply member is a belt.

8. In a pneumatic tire which includes a cord-ply member comprising spaced, mutually parallel, continuous lengths of cords in an elastomeric matrix containing fiber reinforcement, the improvement wherein said reinforcement consists essentially of a plurality of short, discrete filaments, said filaments being a. uniformly dispersed throughout said elastomeric matrix and b. oriented in a direction substantially parallel to said continuous lengths of cords.

9. The structure as defined in claim 8, wherein said cord-ply member is a carcass-ply.

10. The structure as defined in claim 8, wherein said cord-ply member is a tread-ply.

PO-1050
(5/69)

UNITED STATES PATENT OFFICE
CERTIFICATE OF CORRECTION

Patent No. 3,570,573     Dated March 16, 1971

Inventor(s) Leon F. Marker et al

It is certified that error appears in the above-identified patent and that said Letters Patent are hereby corrected as shown below:

Column 1, line 25, the word "an" should read -- can --; line the word "characterized" should read -- a --. Column 2, li₁ the word "o" should read -- to --. Column 3, line 54, the phrase "carcass breaker" should read -- carcass ply --; line the phrase "at angle" should read -- at an angle --; line 6₈ the number "90" should read -- 90° --; line 72, the word "s₁ should read -- strands --. Column 4, line 14, the word "bee should read -- been --. Column 5, line 34, the phrase "and₁ orientation" should read -- and/or cord orientation --; line the word "an" should read -- can --.

Signed and sealed this 7th day of September 1971.

(SEAL)
Attest:

EDWARD M. FLETCHER, JR.
Attesting Officer

ROBERT GOTTSCHALK
Acting Commissioner of Pa₁